US012679781B2

(12) United States Patent
Königshofer et al.

(10) Patent No.: US 12,679,781 B2
(45) Date of Patent: Jul. 14, 2026

(54) METHOD FOR THE TREATMENT OF MAGNESIA-CARBON PRODUCTS

(71) Applicant: REFRACTORY INTELLECTUAL PROPERTY GMBH & CO. KG, Vienna (AT)

(72) Inventors: Sandra Königshofer, St. Lorenzen (AT); Christoph Piribauer, Vallendar (DE); Roland Nilica, Sankt Marein-Feistritz (AT); Thomas Lammer, Turnau (AT); Stefan Heid, Leoben (AT)

(73) Assignee: REFRACTORY INTELLECTUAL PROPERTY GMBH & CO. KG, Vienna (AT)

( * ) Notice: Subject to any disclaimer, the term of this patent is extended or adjusted under 35 U.S.C. 154(b) by 1195 days.

(21) Appl. No.: 17/632,223

(22) PCT Filed: Jun. 22, 2020

(86) PCT No.: PCT/EP2020/067309
§ 371 (c)(1),
(2) Date: Feb. 1, 2022

(87) PCT Pub. No.: WO2021/023424
PCT Pub. Date: Feb. 11, 2021

(65) Prior Publication Data
US 2022/0281776 A1 Sep. 8, 2022

(30) Foreign Application Priority Data
Aug. 5, 2019 (EP) ................................... 19190128

(51) Int. Cl.
*C04B 41/00* (2006.01)
*C04B 35/04* (2006.01)
*C04B 41/80* (2006.01)

(52) U.S. Cl.
CPC .......... *C04B 41/0072* (2013.01); *C04B 35/04* (2013.01); *C04B 41/80* (2013.01);
(Continued)

(58) Field of Classification Search
CPC ... C04B 35/04; C04B 35/043; C04B 35/0435; C04B 35/66; C04B 35/62204;
(Continued)

(56) References Cited

U.S. PATENT DOCUMENTS

| | | | |
|---|---|---|---|
| 4,140,745 A | 2/1979 | Hassler et al. | |
| 6,284,689 B1 * | 9/2001 | Strawbridge | C04B 35/62204 501/100 |
| 2018/0044530 A1 * | 2/2018 | Nishida | C01F 5/14 |

FOREIGN PATENT DOCUMENTS

| | | |
|---|---|---|
| CN | 1332132 A | 1/2002 |
| CN | 101591184 A | 12/2009 |
| | (Continued) | |

OTHER PUBLICATIONS

Espacenet machine translation of Heid et al., EP 2998280 A1 (originally published Mar. 23, 2016) (Year: 2016).*

(Continued)

*Primary Examiner* — Susan D Leong
*Assistant Examiner* — Jennifer L Groux
(74) *Attorney, Agent, or Firm* — CALFEE, HALTER & GRISWOLD LLP

(57) ABSTRACT

The invention relates to a method for treating magnesia-carbon products. The method includes providing magnesia-carbon products, wherein the magnesia-carbon products comprise magnesia and carbon, and wherein the magnesia-carbon products comprise proportions of $Al_4C_3$. The method also includes providing water and providing a gas comprising the following features: the gas comprises carbon dioxide; and the proportion of carbon dioxide in the gas is above (Continued)

the proportion of carbon dioxide in the air. Further, the method includes providing a container that encloses a space, and providing the magnesia-carbon products in the space. The method also includes subjecting the space to temperature and pressure while providing the water and the gas in the space.

14 Claims, 3 Drawing Sheets

(52) U.S. Cl.
CPC ................. *C04B 2235/3206* (2013.01); *C04B 2235/3208* (2013.01); *C04B 2235/3217* (2013.01); *C04B 2235/3272* (2013.01); *C04B 2235/3418* (2013.01); *C04B 2235/3817* (2013.01); *C04B 2235/422* (2013.01); *C04B 2235/72* (2013.01); *C04B 2235/96* (2013.01)

(58) Field of Classification Search
CPC .......... C04B 35/62645; C04B 35/6268; C04B 33/1324; C04B 41/0072; C04B 41/009; C04B 41/80; C22B 1/005; B09B 3/45
See application file for complete search history.

(56) References Cited

FOREIGN PATENT DOCUMENTS

| | | | |
|---|---|---|---|
| CN | 101851103 | A | 10/2010 |
| CN | 102285806 | A | 12/2011 |
| CN | 103553690 | A | 2/2014 |
| CN | 105859307 | A | 8/2016 |
| EP | 2998280 | A1 | 3/2016 |
| JP | 2004-307287 | A | 11/2004 |
| JP | 2013-126927 | A | 6/2013 |
| KR | 10-2011-0124661 | A | 11/2011 |
| WO | 2021023424 | A1 | 2/2021 |

OTHER PUBLICATIONS

Steenkamp et al. "Magnesia refractory dryout-managing the risk of hydration." Journal of the Southern African Institute of Mining and Metallurgy 111, No. 6 (2011): 423-428. (Year: 2011).*

"Office Action for Chinese Patent Application No. 202080054918.8", Mailed Date: Aug. 4, 2022, 8 pages.

Examination Report for Korean Application No. 10-2022-7003491, Dated: Nov. 15, 2024, 8 pages (Machine Translation included).

"Office Action for Chinese Patent Application No. 202080054918.8", Mailed Date: May 15, 2023, 3 pages.

"Office Action for Canadian Patent Application No. 3,144,165", Mailed Date: Dec. 15, 2023, 4 pages.

"Office Action for Japanese Patent Application No. 2022-505483", Mailed Date: Feb. 6, 2023, 4 pages.

* cited by examiner

METHOD FOR THE TREATMENT OF MAGNESIA-CARBON PRODUCTS

CROSS-REFERENCE TO RELATED APPLICATIONS

This application is a United States National Stage Entry of PCT/EP2020/067309, filed on Jun. 22, 2020, and entitled "METHOD FOR THE TREATMENT OF MAGNESIA-CARBON PRODUCTS", which claims priority to European Patent Application No. EP19190128.9, filed on Aug. 5, 2019. The entireties of these applications are incorporated herein by reference.

TECHNICAL FIELD

Background

The invention relates to a method for the treatment of magnesia-carbon products.

Magnesia-carbon products within the meaning of the present invention are products consisting predominantly of magnesia (chemically: MgO; mineralogically: periclase) and carbon (in the form of free carbon; chemically: C).

A major application of such magnesia-carbon products is their use as refractory magnesia-carbon products, i.e., the use of such magnesia-carbon products at high temperatures.

Such use of magnesia-carbon products for refractory applications is in particular in the use of magnesia-carbon products in the steel industry, where refractory magnesia-carbon products are used in particular as wear lining of oxygen blow converters, for refractory lining of electric arc furnaces and steel ladles, and as functional products in continuous casting.

In order to influence the properties of magnesia-carbon products and in particular to suppress oxidation of the carbon in the magnesia-carbon product, it is known to add so-called antioxidants to magnesia-carbon products. Aluminum powder in particular is also known as such an antioxidant. During the operational use of the magnesia-carbon product, the aluminum metal powder reacts with carbon of the magnesia-carbon product to form aluminum carbide $(Al_4C_3)$.

Due to the operational use of the magnesia-carbon product, it is subject to wear, so that the magnesia-carbon product must be removed after a certain time from the place of its intended use during operational use and replaced by a new magnesia-carbon product.

The used, removed magnesia-carbon product still consists mainly of magnesia and carbon even after it has been worn out. For ecological and economic reasons, it is therefore desirable in principle if such used magnesia-carbon product could be made available as a raw material for the manufacture of new products, in particular new magnesia-carbon products. However, a problem with the use of used magnesia-carbon products as a raw material for the production of new magnesia-carbon products is the amount of aluminum carbide $(Al_4C_3)$ in the magnesia-carbon product that has formed in the magnesia-carbon product during its operational use. This is because in the presence of water, $Al_4C_3$ reacts to form either aluminum orthohydroxide and methane according to the following reaction equation (I):

$$Al_4C_3 + 12\ H_2O \rightarrow 4\ Al(OH)_3 + 3\ CH_4\uparrow \qquad \text{(reaction equation I)}$$

or according to the following reaction equation (II) to aluminum metahydroxide and methane:

$$Al_4C_3 + 8\ H_2O \rightarrow 4\ AlO(OH) + 3\ CH_4\uparrow \qquad \text{(reaction equation II).}$$

Furthermore, both the aluminum orthohydroxide (Al(OH)$_3$) formed according to reaction equation I and the aluminum metahydroxide (AlO(OH)) formed according to reaction equation II decompose into aluminum oxide $(Al_2O_3)$ and water $(H_2O)$ when the product is subjected to temperature, the water escaping as water vapor.

Hereinafter, "aluminum hydroxide" refers collectively to one or both of aluminum orthohydroxide and aluminum metahydroxide.

Therefore, in a refractory product manufactured using a used magnesia-carbon product, the formation of aluminum hydroxide and methane may occur in accordance with reaction equations I and II, particularly during annealing of the product. The water required for the reaction may be present in particular as a component of the binders used, but also as atmospheric moisture. While the methane $(CH_4)$ escapes in gaseous form, and to this extent is largely unproblematic, the formation of aluminum hydroxide is problematic, since aluminum hydroxide has a higher volume than $Al_4C_3$, and the formation of aluminum hydroxide is therefore associated with an increase in volume in the product. However, this increase in volume can lead to stresses in the article, which can result in damage to the refractory article. In particular, such damage may be in the form of cracking or spalling, which may even lead to complete destruction of the refractory product. Therefore, an untreated used magnesia-carbon product comprising portions of $Al_4C_3$ cannot be used as a raw material for the production of new refractory products, or only in very small quantities.

Therefore, there has been no lack of attempts in the past to treat used magnesia-carbon products containing portions of $Al_4C_3$ in such a way that they can be used as raw material for the production of new refractory products.

In particular, such used magnesia-carbon products were sprinkled with liquid water or immersed in a water bath to decompose the $Al_4C_3$ into aluminum hydroxide and methane before being used as a raw material for the production of refractory products. However, $Al_4C_3$ reacts only to a limited extent or very slowly to aluminum hydroxide in this process, so that considerable amounts of $Al_4C_3$ remain in the used magnesia-carbon product or the reaction can take up to several weeks, which is problematic from an economic point of view. Furthermore, this treatment of magnesia-carbon products may result in the formation of brucite $(Mg(OH)_2$; magnesium hydroxide) in the used magnesia-carbon product. However, brucite may deteriorate the properties in a product manufactured using such used magnesia-carbon product, as it may, in particular, reduce its strength.

DETAILED DESCRIPTION

Figure 1:
FIG. 1 shows an exemplary magnesia-carbon brick that does not exhibit cracks or spalling.

It is an object of the invention to provide a method for the treatment of magnesia-carbon products comprising $Al_4C_3$, by means of which the proportion of $Al_4C_3$ in the magnesia-carbon product can be reduced more strongly and more rapidly than is possible with the technologies known from the prior art.

It is a further object of the invention is to provide such a method by which the formation of brucite can be suppressed at the same time.

In order to solve these problems, the invention provides a method for the treatment of magnesia-carbon products, comprising the following method steps:

Providing magnesia-carbon products comprising the following features:

the magnesia-carbon products consist mainly of magnesia and carbon;

the magnesia-carbon products comprise proportions of $Al_4C_3$;

providing water;

providing a gas comprising the following features:

the gas comprises carbon dioxide;

the proportion of carbon dioxide in the gas is above the proportion of carbon dioxide in the air;

providing a container enclosing a space;

providing the magnesia-carbon products in the space;

subjecting the space to temperature, and pressure while providing the water and the gas in the space.

The invention is based on the surprising finding that proportions of $Al_4C_3$ in magnesia-carbon products can be effectively reduced by the method according to the invention, and in particular also more effectively and faster than with the technologies known from the prior art. In particular, it was surprisingly found that it is possible with the process according to the invention to completely remove all portions of $Al_4C_3$ in magnesia-carbon products from the magnesia-carbon products or to convert them into other substances, in particular into aluminum hydroxide and methane, during the implementation of the process. In particular, it was surprisingly found that with the process according to the invention it is not only possible to effectively reduce proportions of $Al_4C_3$ in magnesia-carbon products, but also to suppress the formation of brucite at the same time. In particular, the invention is also based on the surprising finding that proportions of $Al_4C_3$ in magnesia-carbon products can be reduced and at the same time the formation of brucite can be suppressed when the magnesia-carbon products are subjected to temperature and pressure, provided that this subjection is carried out while simultaneously providing water and in a gas atmosphere in which the proportion of carbon dioxide ($CO_2$) in the gas is above the proportion of carbon dioxide in the air.

According to a particularly preferred embodiment of the method according to the invention, the container is an autoclave. In this respect, the magnesia-carbon product is provided in the space enclosed by the autoclave, where it is subjected to temperature and pressure with the simultaneous provision of water and the gas.

The container provided for the process according to the invention in the form of an autoclave can in principle be any autoclave known from the prior art in which products can be subjected to temperature and pressure. Particularly preferred is an autoclave in which steam can be made available under excess pressure.

According to a particularly preferred embodiment, the space is subjected with temperature and pressure by providing hot water vapor under excess pressure in the space. By means of this hot water vapor, water can be provided in the space and the space can be subjected to temperature and pressure at the same time. In this respect, the container in the form of an autoclave provided for carrying out the method according to the invention can, for example, be an autoclave in which water vapor can be provided under excess pressure.

The provision of water in the space and subjecting the space to temperature and pressure can be effected, for example, by introducing hot water vapor under excess pressure into the space or by generating hot water vapor in the space of the autoclave.

Preferably, such an amount of water is provided in the space that the portions of $Al_4C_3$ in the magnesia-carbon product provided in the space can react completely or at least substantially with the water according to at least one of the formulas according to the following reaction equations I and II to form either aluminum orthohydroxide and methane or aluminum metahydroxide and methane:

$$Al_4C_3 + 12\ H_2O \rightarrow 4\ Al(OH)_3 + 3\ CH_4 \uparrow \qquad \text{(reaction equation I)}.$$

or:

$$Al_4C_3 + 8\ H_2O \rightarrow 4\ AlO(OH) + 3\ CH_4 \uparrow \qquad \text{(reaction equation II)}.$$

The molar ratio of water to $Al_4C_3$ required for a complete reaction of $Al_4C_3$ with water is therefore 12:1 according to reaction equation I and 8:1 according to reaction equation II.

Accordingly, it is preferably provided that the magnesia-carbon products and the water are provided in such proportions in the space that in the space the molar ratio of water to $Al_4C_3$ is at least 8:1. However, in order to provide with certainty the amount of water required for a complete reaction of $Al_4C_3$ with water, according to the invention it can be provided in particular that the molar ratio of water to $Al_4C_3$ is at least 12:1, in particular slightly more than 12:1. However, according to the invention, it has been found that in the presence of excess water, i.e., when the molar ratio of water to $Al_4C_3$ is substantially greater than 12:1, the formation of brucite may occur. However, this formation of brucite can be suppressed by providing the gas according to the invention with a carbon dioxide content higher than the carbon dioxide content in the air, at least to the extent that the molar ratio of water to $Al_4C_3$ is not substantially above 15:1. Preferably, therefore, the molar ratio of water to $Al_4C_3$ in the space is at most 15:1 when the method according to the invention is carried out.

Preferably, therefore, the molar ratio of water to $Al_4C_3$ in the space when carrying out the method according to the invention is in the range of 8:1 to 15:1, more preferably in the range of 12:1 to 15:1.

As stated above, the suppression of the formation of brucite during carrying out the method according to the invention can be effected in particular by the fact that during the application of temperature and pressure to the magnesia-carbon product in the space and with simultaneous provision of water, gas comprising carbon dioxide is additionally provided at the same time, the proportion of carbon dioxide of which is above the proportion of carbon dioxide in the air. For this purpose, for example, such a gas comprising carbon dioxide can be introduced into the room. The proportion of carbon dioxide in air is about 0.04% by volume, so that the gas provided for the process according to the invention comprises carbon dioxide in a proportion of more than 0.04% by volume, based on the total volume of the gas. According to one embodiment, gas comprising carbon dioxide is provided, the proportion of carbon dioxide of which is in the range from 1 to 100% by volume, in particular in the range from 50 to 100% by volume, with respect to the gas volume. According to one embodiment, it is intended to provide carbon dioxide gas (i.e., gas with a proportion of 100% by volume of carbon dioxide) as the gas comprising carbon dioxide. Insofar as an autoclave is provided as the container, such a gas comprising carbon dioxide can be introduced into the space enclosed by the autoclave. According to the invention, it has been found that the formation of brucite during the performance of the process according to the invention can be suppressed particularly effectively when such proportions of the gas comprising carbon dioxide are provided in the space during the performance of the process according to the invention that in the space the molar ratio of carbon dioxide to water is 1:1. Particularly preferably, therefore, the molar ratio of carbon dioxide to water in the space is 1:1. To the extent that this ratio is not exactly maintained, the molar ratio of carbon dioxide to water in the space is preferably at least 1:2, more preferably at least 2:3, and even more preferably at least 1:1. Further, the molar ratio of carbon dioxide to water in the space is preferably at most 4:1, more preferably at most 3:1 and even more preferably at most 2:1. According to a preferred embodiment, the molar ratio of carbon dioxide to water in the space is in the range of 2:3 to 3:1 and even more preferably in the range of 1:1 to 2:1.

Preferably, according to the invention, it is provided that the space is subjected to a temperature in the range of 100 to 320° C. during the performance of the method according to the invention, since in this temperature range, while simultaneously pressurizing the chamber according to the invention and providing gas comprising water and carbon dioxide, the formation of aluminum hydroxide from $Al_4C_3$ can be achieved and the formation of brucite can be suppressed. According to the invention, it was further found that the formation of aluminum hydroxide from $Al_4C_3$ is accelerated at a temperature of at least 150° C. It was further found that above a temperature of 250° C. the formation of aluminum hydroxide from $Al_4C_3$ is no longer substantially accelerated, so that for economic reasons it is expedient to carry out the method according to the invention at a maximum of 250° C. In this respect, according to a particularly preferred embodiment, it is provided that the space is subjected to temperature in the range from 150 to 250° C.

Preferably, when carrying out the method according to the invention, the space is subjected to pressure in the range from 0.1 to 10 MPa, even more preferably in the range from 0.1 to 6 MPa and particularly preferably in the range from 0.5 to 6 MPa. In accordance with the invention, it was found that when the magnesia-carbon product is subjected to temperature in accordance with the invention while simultaneously providing water and the gas, by pressure in this range $Al_4C_3$ can convert it into aluminum hydroxide while preventing the formation of brucite. Pressure in the sense of the invention is excess pressure, that is, pressure that exceeds the mean atmospheric air pressure at sea level. Thus, for example, in the sense of the invention, a pressure of 0.1 MPa (corresponding, therefore, to about 1 bar) is an excess pressure of 0.1 MPa, i.e., a pressure that exceeds by 0.1 MPa the mean atmospheric air pressure at sea level.

In order to subject the space to pressure when carrying out the method according to the invention, provision can in particular be made to introduce strained water vapor, i.e., water vapor under excessive pressure, into the space. Alternatively, the space can be subjected to pressure, for example, by generating water vapor at excess pressure in the space itself, for example, by subjecting the space or water in the space to temperature, for example, by electrical heating. Alternatively, the space can be subjected to pressure, for example, by means of compressors. In general, the technologies known in the prior art for subjecting an autoclave with pressure can be used to subject the space to pressure.

Water can be made available for carrying out the method according to the invention in the space in at least one of the following states: Liquid or gaseous (i.e., in the form of water vapor). As previously stated, water initially provided in the space in liquid form may be subjected to temperature in the space and thereby change to the vapor phase. Water provided in the form of water vapor in the space can, for example, already be introduced into the space as water vapor. In principle, as explained above, water vapor can be provided under excess pressure in the space, so that the space can be subjected to pressure at the same time.

The magnesia-carbon products provided for carrying out the method according to the invention consist mainly of magnesia (chemical: MgO; mineralogical: periclase) and carbon (in the form of free carbon, chemical: C). The magnesia-carbon products preferably comprise a proportion of MgO in the range of at least 69% by mass, further preferably in the range of 69 to 97% by mass and particularly preferably in the range of 83 to 93% by mass.

According to a preferred embodiment, it is provided that the magnesia-carbon products provided for carrying out the method according to the invention comprise a proportion of carbon of at least 1% by mass. Further preferably, the magnesia-carbon products have a carbon content in the range of 1 to 30% by mass, and more preferably in the range of 5 to 15% by mass.

Preferably, the magnesia-carbon products provided for carrying out the method of the invention have an $Al_4C_3$ content of at least 0.1% by mass. More preferably, the magnesia-carbon products have an $Al_4C_3$ content in the range of 0.1 to 5% by mass, even more preferably in the range of 0.5 to 5% by mass, and even more preferably in the range of 1 to 3% by mass.

According to a particularly preferred embodiment, the magnesia-carbon products provided for the method according to the invention have a total content of MgO, C and $Al_4C_3$ of at least 93% by mass and even more preferably of at least 95% by mass.

The aforementioned proportions of MgO, carbon and $Al_4C_3$ are each based on the total mass of the magnesia-carbon products provided in the space.

The above-mentioned proportions of MgO in the magnesia-carbon products are determined by X-ray fluorescence analysis (XRF) according to DIN EN ISO 12677:2013-02.

The aforementioned proportions of carbon in the magnesia-carbon products are determined in accordance with DIN EN ISO 15350:2010-08.

Furthermore, the aforementioned proportions of $Al_4C_3$ in the magnesia-carbon products are determined qualitatively by means of X-ray diffraction in accordance with DIN EN 13925-2:2003-07. Quantitatively, the proportion of $Al_4C_3$ in the magnesia-carbon products can be determined by means of energy dispersive X-ray spectroscopy (EDX) in accordance with the complementary standards ISO 16700:2016 (E) and ISO 22309:2011(E).

According to a particularly preferred embodiment, the magnesia-carbon products provided for carrying out the method according to the invention are provided as used magnesia-carbon products. Used magnesia-carbon products in the sense of the present invention are those magnesia-carbon products which have already been used in accordance with their intended purpose, i.e. in accordance with their intended use for which they were originally produced.

In particular, this intended use may be the use of the magnesia-carbon products for lining, i.e. refractory lining of aggregates in the steel industry (in particular converters, electric arc furnaces or ladles) or the use of the magnesia-carbon products as functional products for the steel industry, in particular for continuous casting, in particular in the form of purging or tapping ceramics. After the magnesia-carbon products have been used for a certain period of time at their intended location, they are removed and replaced by new magnesia-carbon products. The removal is carried out in particular due to wear of the magnesia-carbon products. These removed magnesia-carbon products may be the used magnesia-carbon products made available for carrying out the method according to the invention. In this respect, the method according to the invention may comprise the following further method step preceding the method step according to which the magnesia-carbon products are provided for the method according to the invention:

Removal of a used magnesia-carbon product from the place of its intended use.

This removed, used magnesia-carbon product can then be provide for the method according to the invention.

According to the invention, the magnesia-carbon products provided for carrying out the method according to the invention are provided or arranged in the space enclosed by the container. After the magnesia-carbon products are provided in the space, the space is subjected to pressure and temperature according to the invention. Preferably, it may be provided that after the magnesia-carbon products have been provided in the space, the space enclosed by the container is closed in a gas-tight manner and then subjected to temperature and pressure. As stated above, water, particularly in liquid form, may be provided in the space before it is subjected to temperature and pressure. Preferably, however, as set forth above, water may be provided or introduced into the space, particularly in the form of water vapor, while simultaneously applying temperature and pressure to the space. Furthermore, as stated above, the gas comprising carbon dioxide can be provided or introduced into the space, in particular during the application of temperature and pressure to the space.

As stated above, the space is subjected to temperature and pressure such that at least a portion of the $Al_4C_3$ in the magnesia-carbon products decomposes during the subjection. Particularly preferably, the space is subjected to temperature and pressure such that the $Al_4C_3$ in the magnesia-carbon products decomposes predominantly during the subjection.

In particular, the $Al_4C_3$ decomposes into aluminum hydroxide and $CH_4$ during the space is subjected to temperature and pressure.

After treatment, the magnesia-carbon products treated by the method according to the invention have a significantly reduced proportion or even no measurable proportion of $Al_4C_3$. At the same time, the formation of brucite can be suppressed during the implementation of the method according to the invention, so that the magnesia-carbon products treated by the method according to the invention have no or only very low proportions of brucite. This makes the magnesia-carbon products treated by the method according to the invention eminently suitable as raw materials for the production of refractory products.

In this respect, the method according to the invention may have the further process steps downstream the process step of subjecting the space to temperature and pressure:

Conveying the magnesia-carbon products from the space;
mixing the magnesia-carbon products with one or more further materials to form a batch;
producing a refractory product from the batch.

The produced refractory product may in particular be a new magnesia-carbon product.

Further features of the invention will be apparent from the claims and from the examples of embodiments of the invention described below.

All features of the invention may be combined, individually or in combination, in any desired manner.

EXEMPLARY EMBODIMENT

A magnesia-carbon product in the form of a refractory magnesia-carbon brick was provided. To simulate the use of this magnesia-carbon brick in a steel industry aggregate, the magnesia-carbon brick was carbonized with an addition of 3% by mass of aluminum grit (based on 100% by mass of magnesia and carbon of the magnesia-carbon brick) as an antioxidant at 1,000° C. for 6 hours under a reducing atmosphere.

The magnesia-carbon product obtained thereafter was provided for carrying out the method of the invention. This magnesia-carbon product had the following chemical composition, which was determined by X-ray fluorescence analysis (XRF) according to DIN EN ISO 12677:2013-02:

MgO: 92.6% by mass
$Al_2O_3$: 5.0% by mass
$SiO_2$: 0.8% by mass
CaO: 1.0% by mass
$Fe_2O_3$: 0.6% by mass In addition to these compounds, the loss on ignition was determined to be 8.8% by mass, based on the mass of the compounds without the loss on ignition.

In each case, the mass data given above are based on the total mass of the magnesia-carbon product.

The percentage of carbon was determined by means of a carbon analyzer of the type LECO CS-200/230 (trademark owner and manufacturer LECO Instrumente GmbH, Mönchengladbach, Germany) according to the standard DIN EN ISO 15350:2010-08 with 8.2% by mass, based on the total mass of the magnesia-carbon product.

Finally, the amount of $Al_4C_3$ in the magnesia-carbon product was first determined qualitatively by X-ray diffraction according to DIN EN 13925-2:2003-07 and then quantitatively determined by energy dispersive X-ray spectroscopy (EDX) according to the complementary standards ISO 16700:2016(E) and ISO 22309:2011(E) to be 1.9% by mass, again based on the total mass of the magnesia-carbon product.

The carbon product was introduced into the space of a commercial, industrial autoclave together with liquid water, and the chamber was then sealed gas-tight.

The space was then subjected with excess pressure of 3 MPa and a temperature of 200° C. Due to the temperature, the water introduced into the space formed a water vapor atmosphere in the space.

At the same time, a gas comprising carbon dioxide in the form of pure carbon dioxide gas was introduced into the space.

The water was introduced into the space (and was subsequently present in the space as water vapor in such a mass) equal to 3% of the mass of the magnesia-carbon product provided in the space. Thus, the molar ratio of water to $Al_4C_3$ in the space was slightly above 12:1.

Further, the carbon dioxide gas was introduced into the space in such a mass that the molar ratio of carbon dioxide to water in the space was 1:1.

This application of temperature and pressure to the space while providing carbon dioxide gas and water vapor was maintained for a period of 12 hours.

During this treatment of the magnesia-carbon product, the $Al_4C_3$ present in it was decomposed into aluminum hydroxide and $CH_4$. At the same time, a conversion of MgO to brucite was suppressed.

After the magnesia-carbon product was treated in the space, it was conveyed out of the space and the amount of $Al_4C_3$ in the magnesia-carbon product was again determined by X-ray diffraction. Thereafter, no more $Al_4C_3$ could be detected in the magnesia-carbon product.

Furthermore, the amount of brucite in the magnesia-carbon product was determined by X-ray diffraction according to the standard DIN EN 13925-2:2003-07. According to this, the presence of brucite could not be detected.

The magnesia-carbon product conveyed out of the space was mixed with other materials in the form of magnesia and graphite to form a batch. In the batch, the proportion of magnesia-carbon products treated by the method of the invention was 30% by mass, based on the total mass of the batch. Subsequently, a refractory product in the form of a new magnesia-carbon product was produced from the batch. For this purpose, the batch was pressed into a magnesia-carbon brick and then annealed at a temperature of 200° C. for a period of 6 hours. The refractory product obtained thereafter in the form of the magnesia-carbon brick is shown in FIG. 1. It can be clearly seen that the magnesia-carbon brick as shown in FIG. 1 does not exhibit any cracks or spalling.

Figure 2:
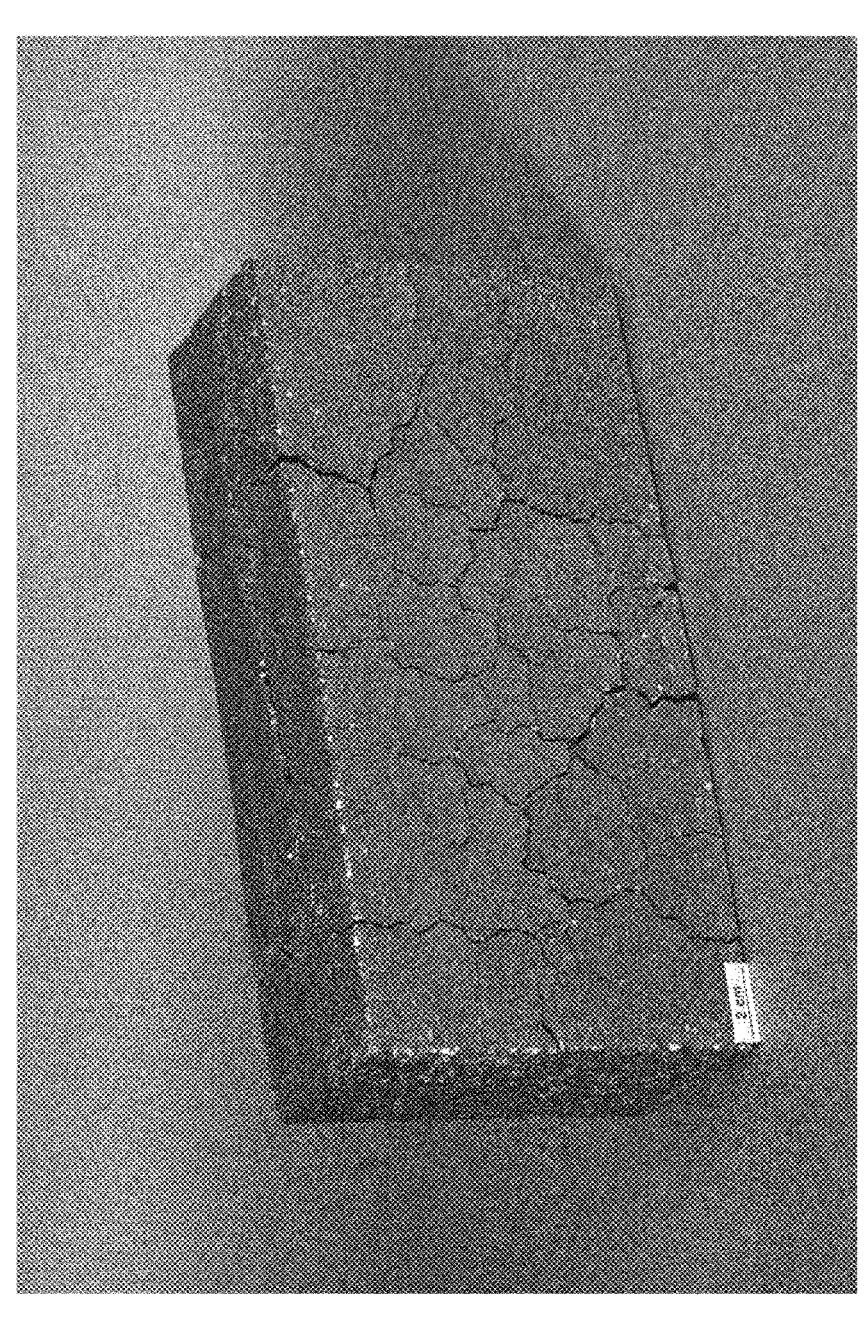
FIG. 2 shows an exemplary magnesia-carbon brick that includes cracks.

For comparison purposes, another magnesia-carbon brick was produced. This was produced in accordance with the magnesia-carbon brick (MgO—C brick) described above, but with the only difference that instead of the magnesia-carbon product treated in accordance with the exemplary embodiment, the untreated magnesia-carbon product provided for the exemplary embodiment was used for the production. The magnesia-carbon brick obtained thereafter is shown in FIG. 2. It can be clearly seen that this brick has considerable cracks, as a result of which the properties of the brick are considerably adversely affected.

Figure 3:
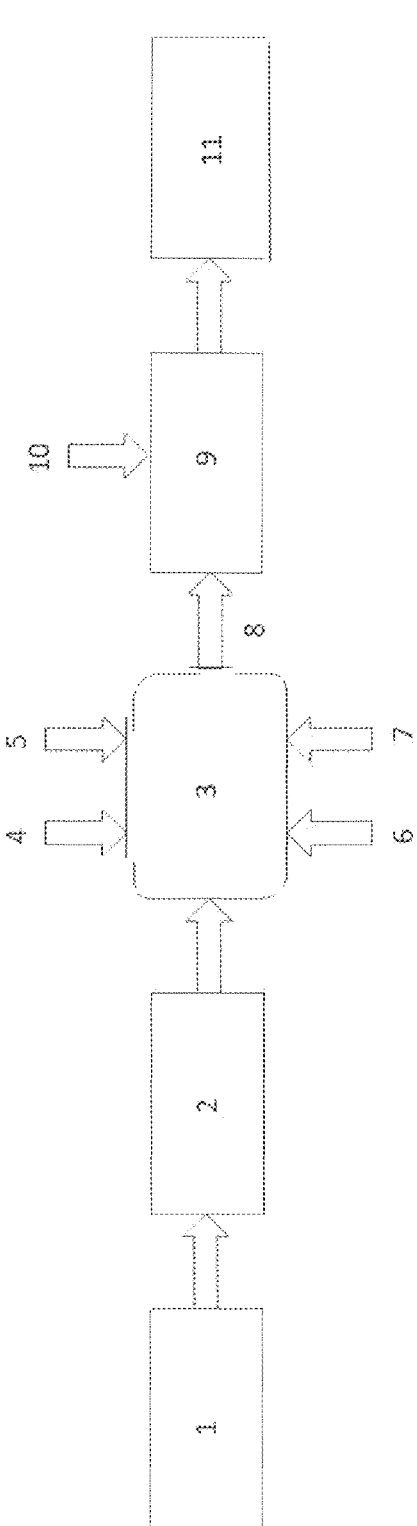
FIG. 3 shows an exemplary flow diagram of an embodiment of a method described herein.

FIG. 3 shows a highly schematized flow diagram of a further embodiment of the method according to the invention.

According to reference sign 1, a used magnesia carbon product was first removed from a steel ladle and, according to reference sign 2, provided for carrying out a method according to the invention. The magnesia carbon product provided according to 2 was then provided together with water 4 in the space enclosed by an autoclave 3, and the space was sealed gas-tight.

Furthermore, a gas 5 comprising carbon dioxide, the proportion of which was higher than the proportion of carbon dioxide in the air, was provided.

Subsequently, the space as subjected to temperature 6 and pressure 7. Furthermore, the gas 5 comprising carbon dioxide was introduced into the space at the same time.

After the magnesia carbon product 2 was appropriately treated in the space of the autoclave 3, it was conveyed out of the space of the autoclave 3 according to 8 and mixed with other substances 10 to form a batch 9. Finally, a new refractory product 11 was produced from the batch 9.

The invention claimed is:

1. A method for the treatment of magnesia-carbon products, comprising the following method steps:
   A. providing magnesia-carbon products comprising the following features:
     A.1 the magnesia-carbon products comprise magnesia and carbon;
     A.2 the magnesia-carbon products comprise proportions of $Al_4C_3$;
   B. providing water;
   C. providing a gas comprising the following features:
     C.1 the gas comprises carbon dioxide;
     C.2 the proportion of carbon dioxide in the gas is above the proportion of carbon dioxide in the air;
   D. providing a container that encloses a space;
   E. providing the magnesia-carbon products in the space;
   F. subjecting the space to
     F.1 temperature; and
     F.2 pressure in the range of 0.1 to 6 MPa
     while providing the water and the gas in the space.

2. The method of claim 1, wherein the magnesia-carbon products are used magnesia-carbon products.

3. The method according to claim 1, wherein the magnesia-carbon products and the water are provided in the space in such proportions that in the space the molar ratio of water to $Al_4C_3$ is at least 8 to 1.

4. The method according to claim 1, wherein the gas and the water are provided in such proportions in the space that in the space the molar ratio of carbon dioxide to water is at least 1 to 1.

5. The method according to claim 1, wherein, during the subjecting, the temperature is in the range of 100 to 320° C.

6. The method according to claim 1, wherein the gas is carbon dioxide gas.

7. The method according to claim 1, wherein the space enclosed by the container is sealed gas-tight after providing the magnesia-carbon products in the space.

8. The method according to claim 1, wherein the container is an autoclave.

9. The method according to claim 1, wherein the magnesia-carbon products comprise an $Al_4C_3$ content of at least 0.1% by mass, based on a total mass of the magnesia-carbon products before the subjecting.

10. The method according to claim 1, wherein the magnesia-carbon products comprise a proportion of MgO of at least 69% by mass, based on a total mass of the magnesia-carbon products before the subjecting.

11. The method according to claim 1, wherein the magnesia-carbon products comprise a carbon content of at least 1% by mass, based on a total mass of the magnesia-carbon products before the subjecting.

12. The method according to claim 1, wherein the space is subjected to the temperature and the pressure such that at least a portion of the $Al_4C_3$ decomposes during the subjecting.

13. The method according to claim 12, wherein the decomposed $Al_4C_3$ reacts at least partially to form aluminum hydroxide.

14. The method according to claim 1, comprising the following further process steps:
   G conveying treated magnesia-carbon products, after the subjecting, from the space;
   H. mixing the treated magnesia-carbon products with one or more further substances to form a batch; and
   I. producing a refractory product from the batch.

* * * * *